(12) United States Patent
Hibbs et al.

(10) Patent No.: US 7,563,529 B2
(45) Date of Patent: Jul. 21, 2009

(54) ENERGY STORAGE SYSTEM

(75) Inventors: Bart D. Hibbs, Altadena, CA (US); William M. Parks, Simi Valley, CA (US); Omourtag A. Velev, La Crescenta, CA (US)

(73) Assignee: Aerovironment Inc., Monrovia, CA (US)

( * ) Notice: Subject to any disclaimer, the term of this patent is extended or adjusted under 35 U.S.C. 154(b) by 0 days.

(21) Appl. No.: 11/981,312

(22) Filed: Oct. 31, 2007

(65) Prior Publication Data
US 2008/0166603 A1     Jul. 10, 2008

Related U.S. Application Data

(62) Division of application No. 10/418,737, filed on Apr. 17, 2003.

(60) Provisional application No. 60/373,301, filed on Apr. 17, 2002.

(51) Int. Cl.
*H01M 8/04*     (2006.01)
(52) U.S. Cl. .............................. 429/22; 429/13; 429/26
(58) Field of Classification Search ........................ None
See application file for complete search history.

(56) References Cited

U.S. PATENT DOCUMENTS

| | | | |
|---|---|---|---|
| 5,306,577 A | 4/1994 | Sprouse | |
| 5,346,778 A | 9/1994 | Ewan et al. | |
| 5,407,756 A | 4/1995 | Sprouse | |
| 5,810,284 A | 9/1998 | Hibbs et al. | |
| 6,568,633 B2 | 5/2003 | Dunn | |
| 6,569,298 B2 | 5/2003 | Merida-Donis | |
| 6,833,206 B2 | 12/2004 | Erdle et al. | |
| 6,887,601 B2 | 5/2005 | Moulthrop, Jr. et al. | |
| 2003/0054215 A1 | 3/2003 | Doshi et al. | |
| 2004/0028966 A1* | 2/2004 | Hibbs et al. ................... | 429/21 |

FOREIGN PATENT DOCUMENTS

| EP | 0 755 088 A2 | 1/1997 |
|---|---|---|
| WO | WO 01/76941 A2 | 10/2001 |
| WO | WO 02/27814 A2 | 4/2002 |

OTHER PUBLICATIONS

International Searching Authority, "PCT International Search Report" for International application PCT/US 03/12147 (which corresponds to the parent application), Sep. 20, 2004.

* cited by examiner

*Primary Examiner*—John S Maples
(74) *Attorney, Agent, or Firm*—Eric J. Aagaard, Esq.; The Law Office of John A. Griecci

(57) ABSTRACT

A closed loop energy storage system configured with a hydrogen tank, an oxygen tank, a fuel cell stack and an electrolyzer. A heat exchanger freeze-dries the hydrogen and oxygen prior to their storage in their respective tanks. The heat exchanger also uses excess fuel cell heat to preheat streams of hydrogen and oxygen coming from the tanks. Phase separators serve both to separate water from hydrogen and oxygen, and to store the water. A thermal management system encloses all the system components except the tanks. An airfoil-shaped shell covers the system, and the larger of the two tanks extends substantially across the shell at its point of greatest camber thickness. The tanks are composed of polymer liners integral with composite shells.

9 Claims, 13 Drawing Sheets

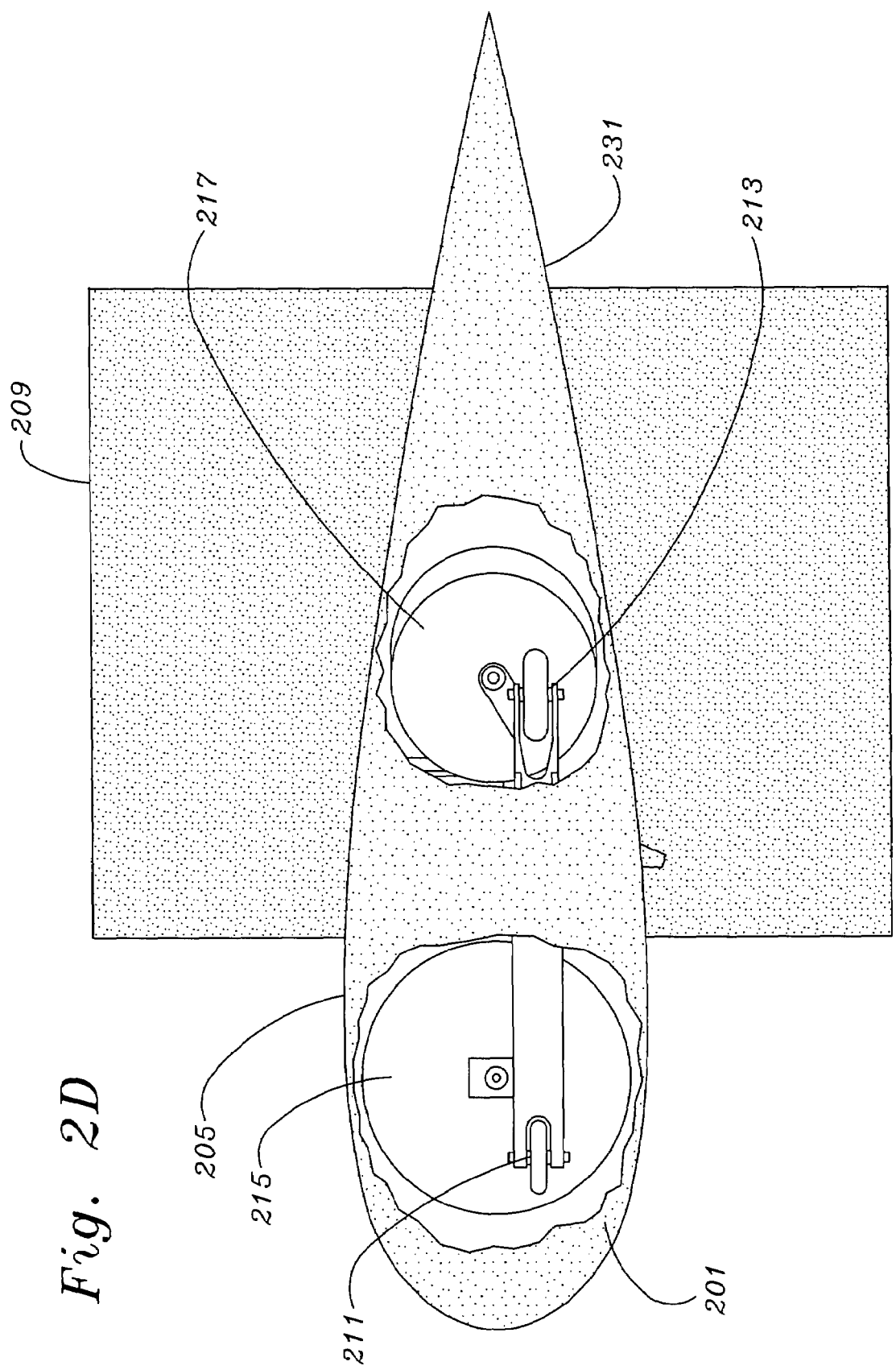

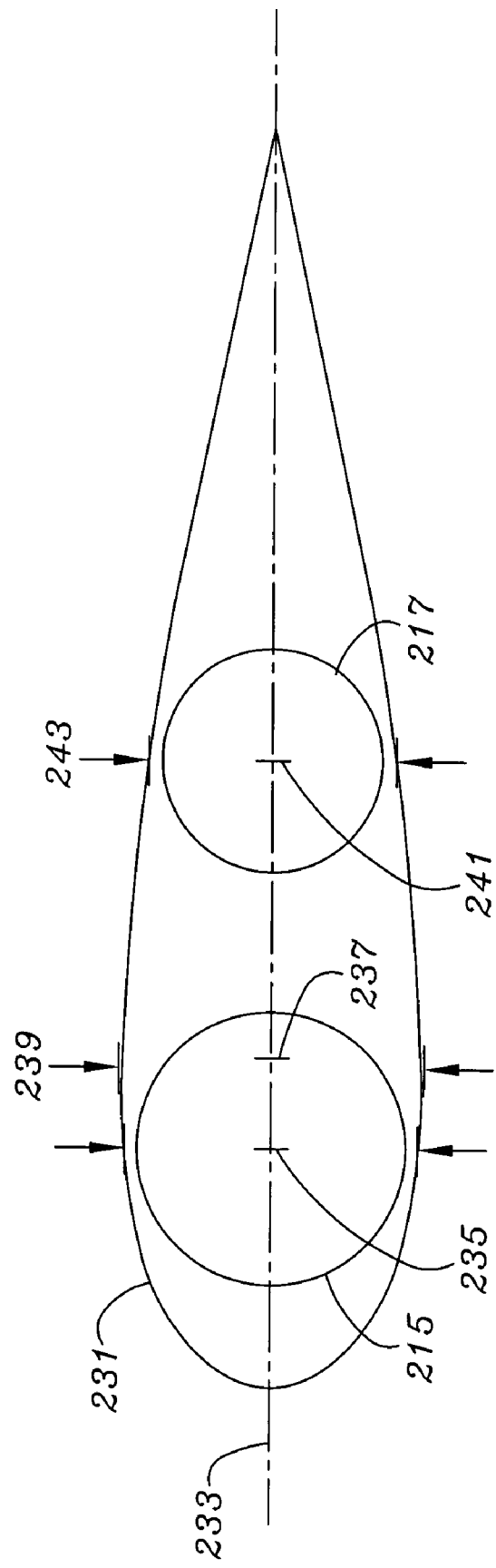

ENERGY STORAGE SYSTEM

This application is a divisional application of application Ser. No. 10/418,737, filed Apr. 17, 2003, which claims priority from U.S. provisional patent application 60/373,301, filed Apr. 17, 2002, both of which are incorporated herein by reference for all purposes.

BACKGROUND

This invention relates generally to methods and apparatus for storing energy and, more particularly, to energy storage systems for high-altitude, light weight, long duration solar powered aircraft, and related methods.

Aircraft are used in a wide variety of applications, including travel, transportation, fire fighting, surveillance and combat. Various aircraft have been designed to fill the wide array of functional roles defined by these applications. Included among these aircraft are balloons, dirigibles, traditional fixed wing aircraft, flying wings and helicopters.

One functional role that a few aircraft have been designed to fill is that of a tightly stationed (i.e., maintained in a small, laterally and vertically limited airspace), high-altitude (e.g., stratospheric), long-duration platform. Operating from high, suborbital altitudes at temperatures well below the freezing point of water, such aircraft can operate as communication relay stations between ground-based and space-based stations. However, to have truly long flight durations, the aircraft must either carry enough fuel to last extreme lengths of time or have the ability to refuel and/or recharge its energy storage system.

Given the broad range of functions that a long-duration, tightly stationed, suborbital platform has the potential to perform, it is desirable to design such platforms to be capable of handling larger payloads and power demands, which typically drain resources necessary to maintain flight through a full range of typical weather conditions.

One potential source of power that can be used to recharge an aircraft's energy storage is solar power. However, solar power is intermittent, and solar-powered aircraft must have significant energy storage systems to store enough energy to fly through each night during a flight.

Therefore, there exists a definite need for apparatus and related methods for repeatedly storing and discharging energy. Preferably, using such methods, such an apparatus should be able to operate up to very high, suborbital altitudes for a long period of time. Importantly, it is desirable for such apparatus to have significant energy storage capacity while weighing as little as possible. Furthermore, it is preferable for such an apparatus to be relatively inexpensive to build, maintain and operate and, furthermore, be relatively pollution-free. Various embodiments of the present invention can meet some or all of these needs, and provide further, related advantages.

SUMMARY OF THE INVENTION

In various embodiments, the present invention solves some or all of the needs mentioned above, providing an energy storage system and related aircraft structures, as well as related methods.

A closed loop energy storage system of the invention typically includes a fuel cell stack configured to react a gaseous fuel with a gaseous oxidizer to produce a liquid product and electrical power, and an electrolyzer stack configured to separate the liquid product into a humid fuel including the gaseous fuel and product humidity, and a humid oxidizer including the gaseous oxidizer and product humidity. The energy storage system also typically includes a fuel tank configured to store dried, gaseous fuel and an oxidizer tank configured to store dried, gaseous oxidizer.

A preferred feature of the invention is a heat exchanger configured to remove the product humidity from the humid fuel and the humid oxidizer by freezing the product humidity, to produce dried, gaseous fuel and dried, gaseous oxidizer, wherein the heat exchanger is further configured to preheat the gaseous fuel from the fuel tank and the gaseous oxidizer from the oxidizer tank prior to their being reacted in the fuel cell stack. Advantageously, this bidirectional feature will generally provide for weight reduction and system simplification. The weight reduction allows for superior performance for a given set of flight parameters, and the system simplification contributes to reliability and cost efficiency.

A second preferred feature of the invention is that the heat exchanger is configured to use excess heat from the fuel cell stack to preheat the gaseous fuel from the fuel tank and the gaseous oxidizer from the oxidizer tank. This feature generally provides for energy-efficiency.

A third preferred feature of the invention is that the system may further include phase separators that serve both to separate gaseous reactants from liquid reaction product, and to store the liquid reaction product for use in the electrolyzer. This feature generally provides for a structurally, functionally and thermodynamically simpler system.

A fourth preferred feature of the invention is that the system may further include a thermal management system for product-containing components but not for the storage tanks, along with the heat exchanger/drier. This feature generally provides for cost and weight efficiency.

A fifth preferred feature of the invention is that the system may further include an airfoil-shaped outer shell containing the storage tanks, wherein the larger tank extends substantially across the airfoil-shaped outer shell profile at its point of greatest camber thickness. This feature generally provides for weight and aerodynamic efficiency.

A sixth preferred feature of the invention is that the system storage tanks may be composed of polymer liners integral with composite shells. This feature generally provides for weight efficiency.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

BRIEF DESCRIPTION OF THE DRAWINGS

FIG. 2D is a bottom plan, cross-section view of the energy storage system pod depicted in FIG. 2A.

FIG. 2G is a top plan airfoil configuration drawing of the energy storage system pod depicted in FIG. 2A, showing the camber at various chord locations.

DETAILED DESCRIPTION OF THE PREFERRED EMBODIMENTS

The present invention provides an energy storage system. Features and advantages of the invention will become apparent from the following detailed description of the preferred embodiments, taken in conjunction with the accompanying drawings, which illustrate, by way of example, the principles of the invention.

Figure 1:
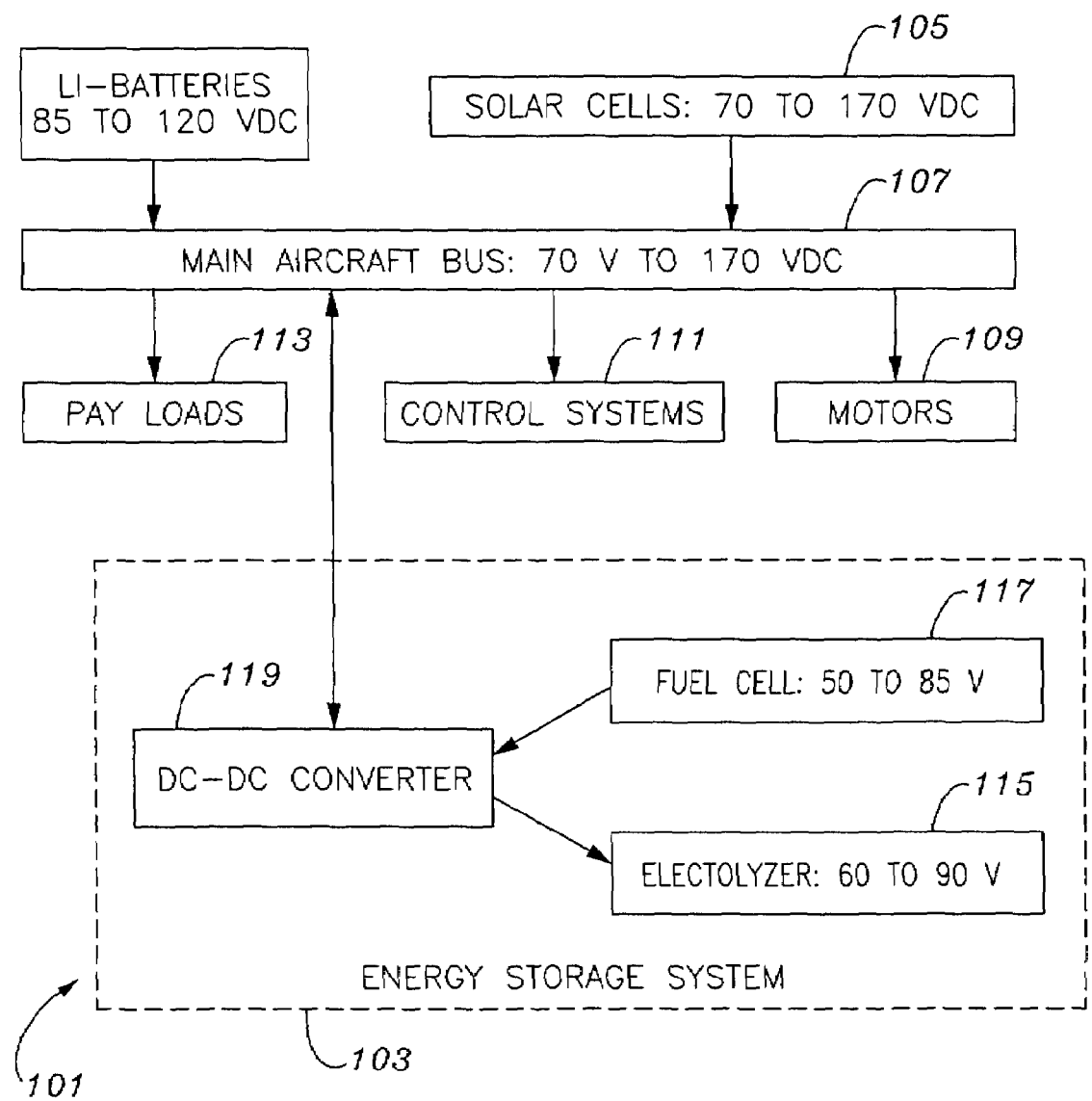
FIG. 1 is a schematic representation of a solar aircraft power system.

With reference to FIG. 1, a solar aircraft power system 101, including a first energy storage system 103 embodying the invention, includes solar cells 105 to provide power through a power bus 107 for aircraft motors 109 and other aircraft loads such as aircraft control systems 111 (including the energy storage system control system) and various active payloads 113. The solar cells also provide enough excess power to charge the energy storage system during the day so that the energy storage system can provide electrical energy to operate some or all of the aircraft's electrical loads when solar power is limited or not available, such as at night. Preferably, the energy storage system uses an electrolyzer stack 115 and a fuel cell stack 117 to store and release power, respectively.

The energy storage system is electrically connected to the aircraft's electrical power bus via DC-DC converter circuitry 119 configured to accommodate the voltage level requirements of the electrolyzer stack and the fuel cell stack. More particularly, a lightweight, high-efficiency bidirectional DC-DC converter is preferably used to connect the fuel cell and the electrolyzer stack to the main aircraft power bus, which preferably operates between 70 and 170 V DC. The DC-DC converter preferably operates at high conversion efficiencies. Since the optimum fuel cell and electrolyzer stack voltages might differ in preferred voltage ranges (e.g., 50-85 V for the fuel cell and 60-90 V for the electrolyzer), a converter might be essential for connecting the stacks to the main power bus. A high-efficiency converter provides the flexibility to optimize the stack electrochemical performance and packaging to achieve efficient, lightweight, and reliable stack designs.

It may become possible in the future to make stacks with operational voltages in the same range as the bus voltage. This would allow for direct connection of the fuel cell to the bus without a DC-DC converter, resulting in a small efficiency gain. During the daytime a DC-DC converter is still preferred. This is because during the daytime it is necessary to provide sufficient power to the propulsion system while keeping the bus voltage at a value that maximizes solar array power output. These two requirements need two controls to achieve. Here, the two controls are the motor throttle and the DC-DC voltage ratio.

Preferably an autonomous, fault-tolerant control system is used to control the energy storage system pod. Dual redundant energy storage system control computers are preferably used in each pod to collect data and control system components. In the event one energy storage system computer fails, the second energy storage system control computer automatically takes over control of the energy storage system. Sensors are used to collect system health information that is used by the control system to optimize performance and ensure safe operation. Predefined safety checks are automatically performed to ensure all system operating parameters are within limits. The system health data are downloaded via an RF link and displayed on ground control computers. Warnings are displayed on the ground control screens when any parameter exceeds predefined limits. Automated shutdowns occur when key safety limits are exceeded. The charging and discharging cycle is fully automated, with manual overrides.

Energy Storage System Pod

With reference to FIGS. 2A-2G and 3A-3B, the energy storage system is preferably a closed loop system contained in a pod 201 that hangs down from the wing of the aircraft. Under the direction of its control system, the energy storage system stores excess power provided by aircraft's solar array during the day and provides the power needed to operate the solar aircraft at night. Preferably, more than one pod is mounted on an aircraft to provide additional storage capacity and redundancy, and the pods are modular. The energy storage system pods are lightweight and operate at high-efficiency, preferably enabling the solar aircraft to fly continuously (up to six months or more) at high altitudes, above commercial air traffic lanes and the jet stream, without landing. An example of an appropriate aircraft for using such pods may be found in U.S. Pat. No. 5,810,284, which is incorporated herein by reference for all purposes.

The pod defines a forward and rearward direction based on the aircraft's normal flight orientation and the resulting relative fluid flow (i.e., airflow past the pod). The pod 201 includes an inner frame having a main shaft 203, and further includes an outer shell 205. The frame main shaft includes a structural attach point 207 at an upper end of the frame main shaft, for attaching the pod to an aircraft wing 209. The frame also includes a forward wheel 211 and a rearward wheel 213 mounted on lateral frame struts 219 at a lower end of the frame, the wheels being configured to bear landing loads for the aircraft.

Figure 2A:
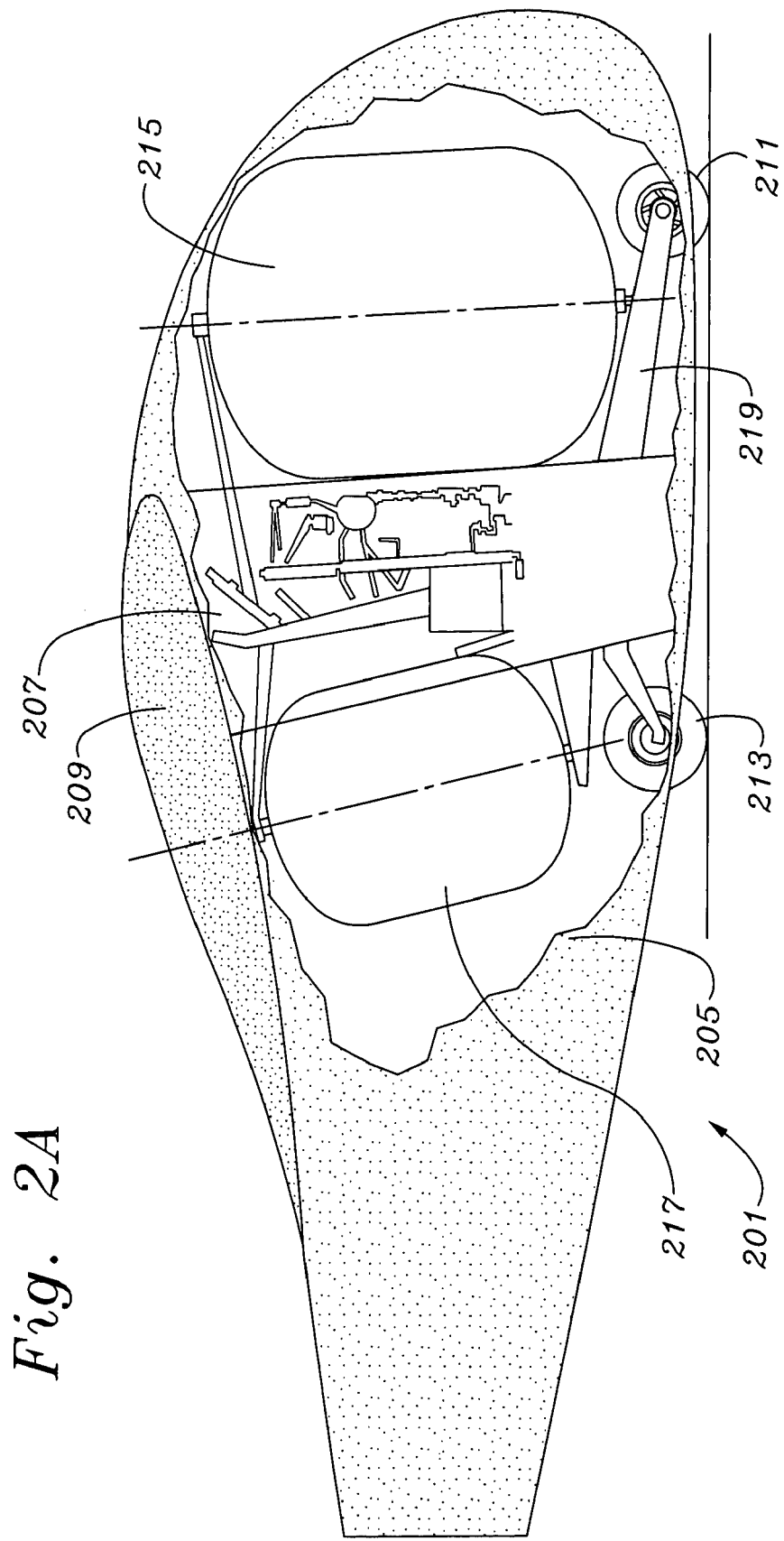
FIG. 2A is a right side, elevational cross-section view of an energy storage system pod embodying the present invention.
Figure 2B:
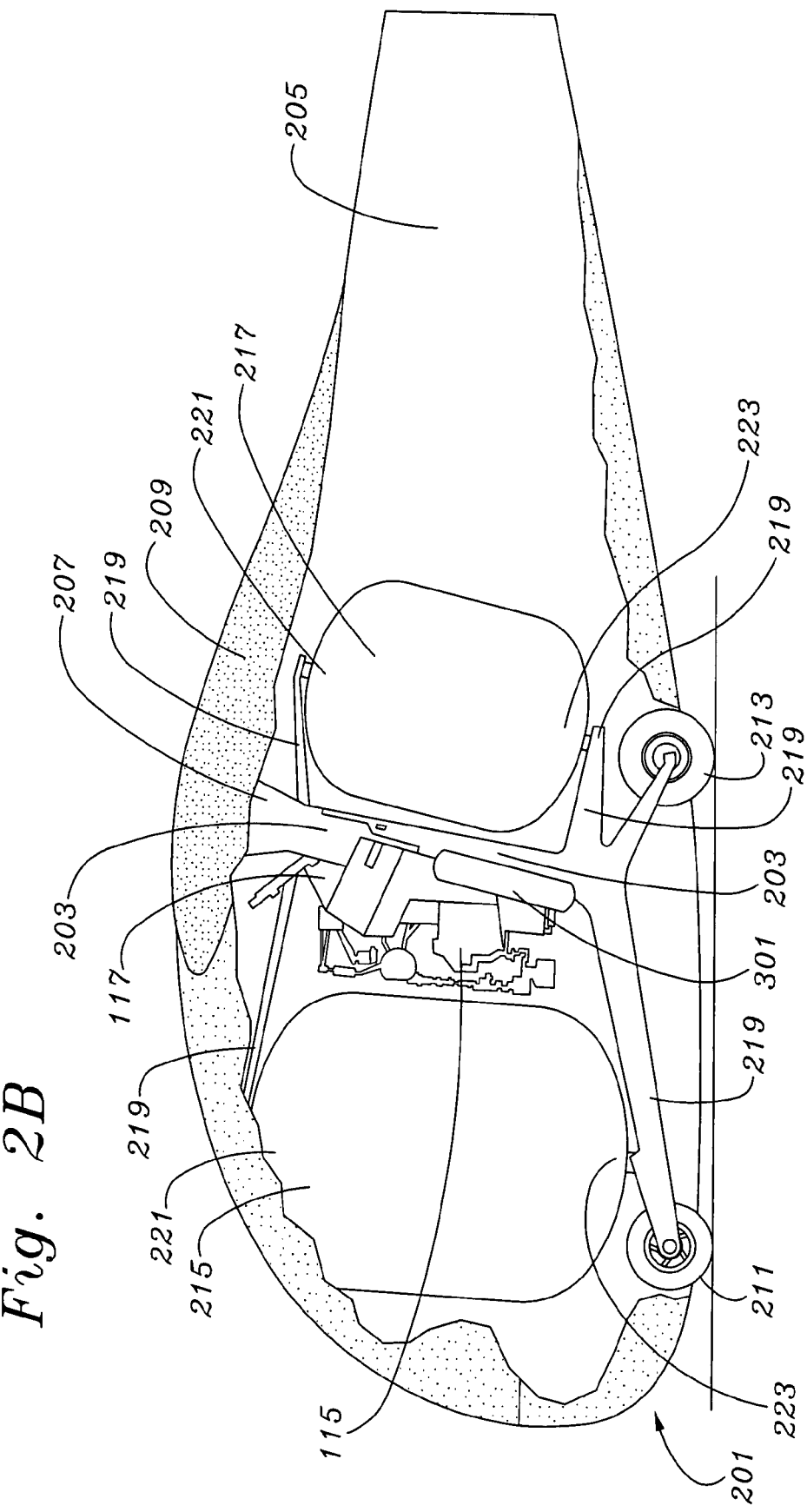
FIG. 2B is a left side, elevational cross-section view of the energy storage system pod depicted in FIG. 2A.

The frame supports both the 205 shell and various components of the energy storage system, including a fuel storage tank 215 ("the fuel tank") for accumulating and storing fuel (e.g., $H_2$), and an oxidizer storage tank 217 ("the oxidizer tank") for accumulating and storing an oxidizer (e.g., $O_2$). These two tanks are cylindrical tanks, and each tank defines a tank axis along the tanks' cylindrical axis of symmetry. The tanks are preferably supported with their tank axes in a relatively vertical orientation, as shown in FIG. 2A.

The tanks are each supported by lateral frame struts 219 that support the tanks at upper and lower tank ends, 221 and 223, respectively, along the tank axes. The fuel tank 215 is positioned forward of the frame main shaft 203 and over the lateral frame strut 219 upon which the forward wheel 211 is mounted. The oxidizer tank 217 is positioned rearward of the frame main shaft and over the lateral frame strut 219 upon which the rearward wheel 213 is mounted. Optionally, the lateral frame struts supporting the wheels can also be configured as lateral struts supporting the lower ends of the tanks.

In this configuration, the larger of the two tanks, which is the fuel tank 215 in this embodiment, is therefore mounted forward of the frame main shaft 203, which is forward of the smaller of the tanks within the shell 205. Preferably, most or all of the remaining components of the energy storage system, including all components that at least occasionally contain the product of the fuel cell reaction ("the liquid product" or "the product") (e.g., $H_2O$), are positioned proximate the frame main shaft 203, and between the forward, fuel tank and the rearward, oxidizer tank 217.

These remaining components include the fuel cell stack 117 and the electrolyzer stack 115, as well as other components that at least occasionally contain the product of the fuel cell reaction. Preferably, these remaining components of the energy storage system, or at least all components that at least occasionally contain the product of the fuel cell reaction, are retained within a thermal enclosure. Preferably, the energy storage system works with a thermal control system that prevents water from freezing at any point in the system except for the oxygen and hydrogen gas driers. Preferably, the fuel tank and the oxidizer tank are not thermally enclosed.

Figure 2C:
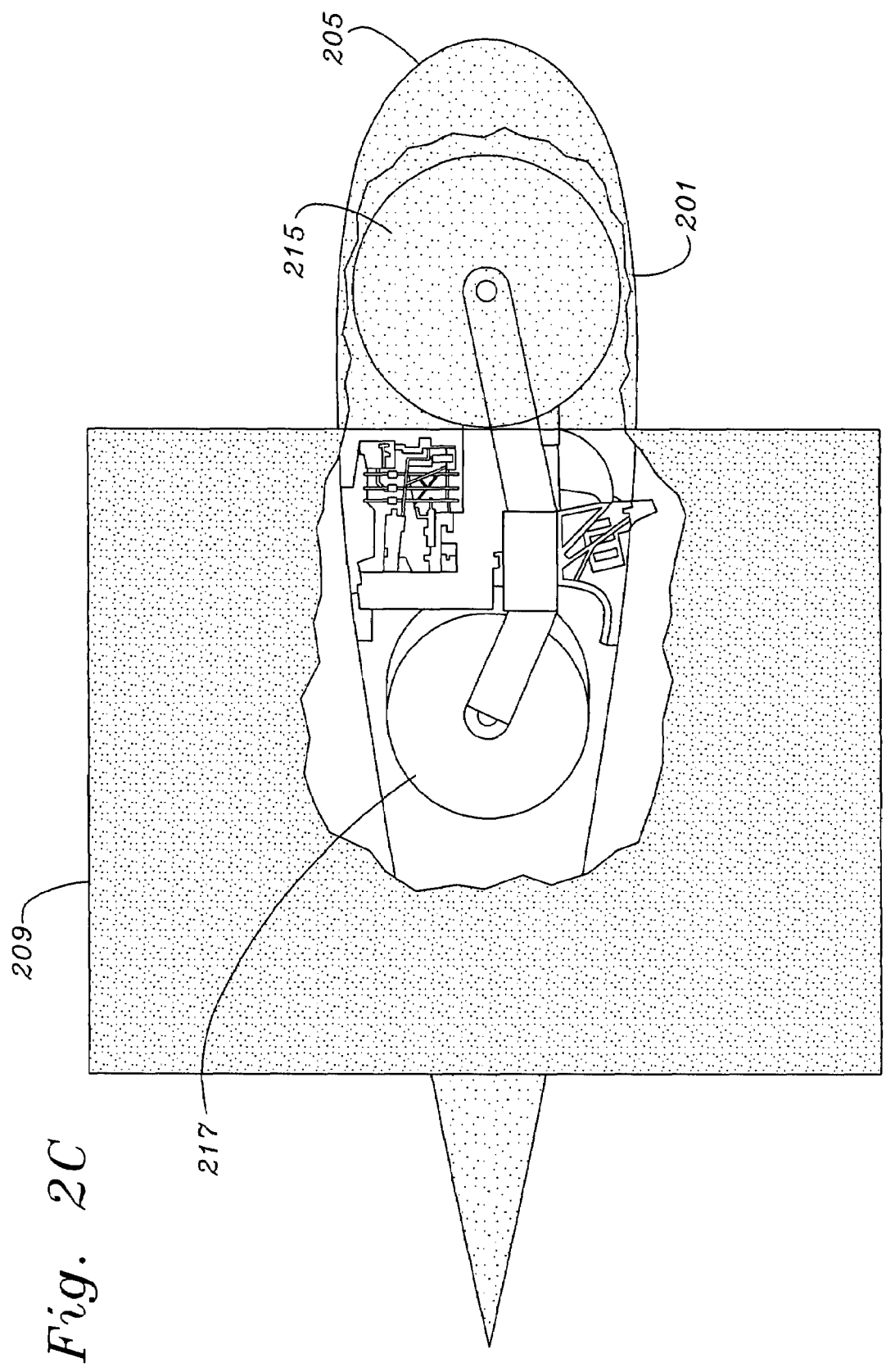
FIG. 2C is a top plan, cross-section view of the energy storage system pod depicted in FIG. 2A.
Figure 2E:
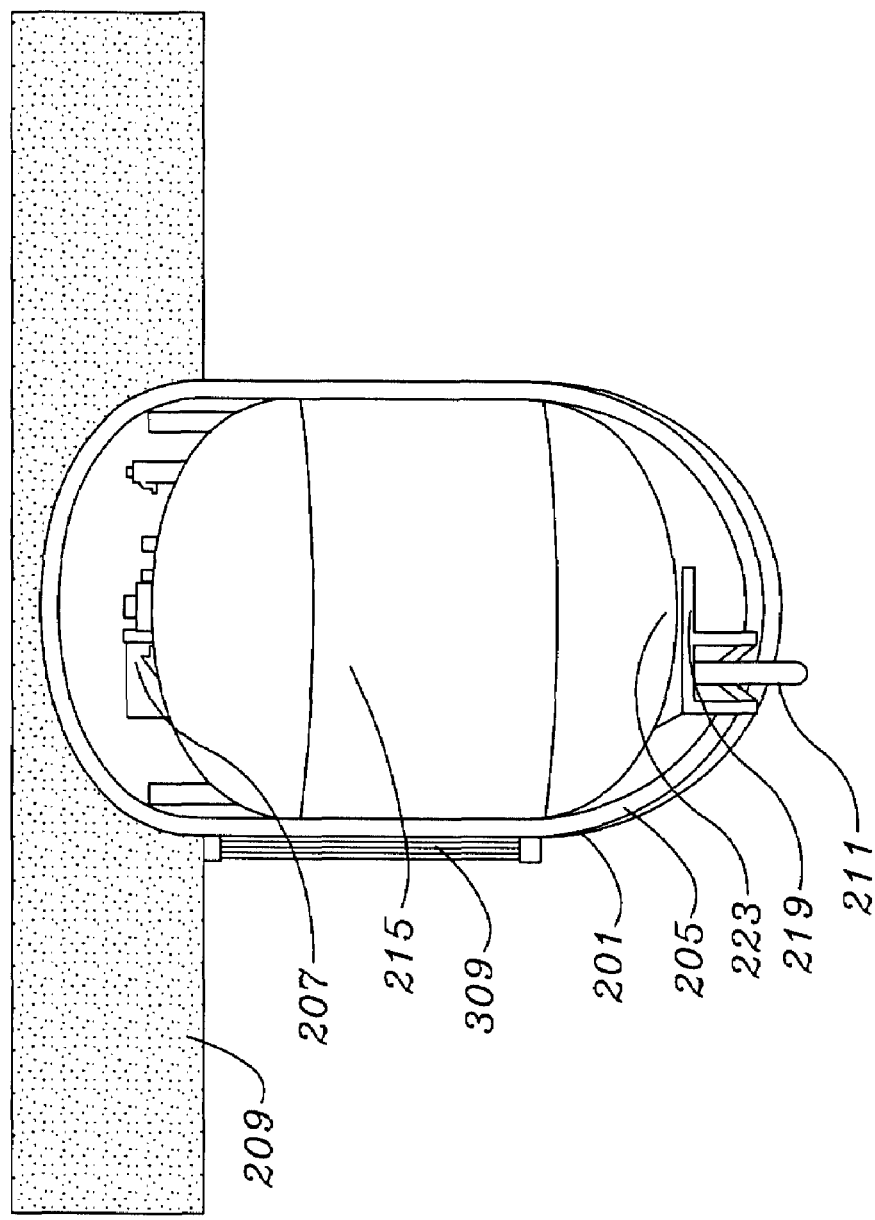
FIG. 2E is a front elevational, cross-section view of the energy storage system pod depicted in FIG. 2A.
Figure 2F:
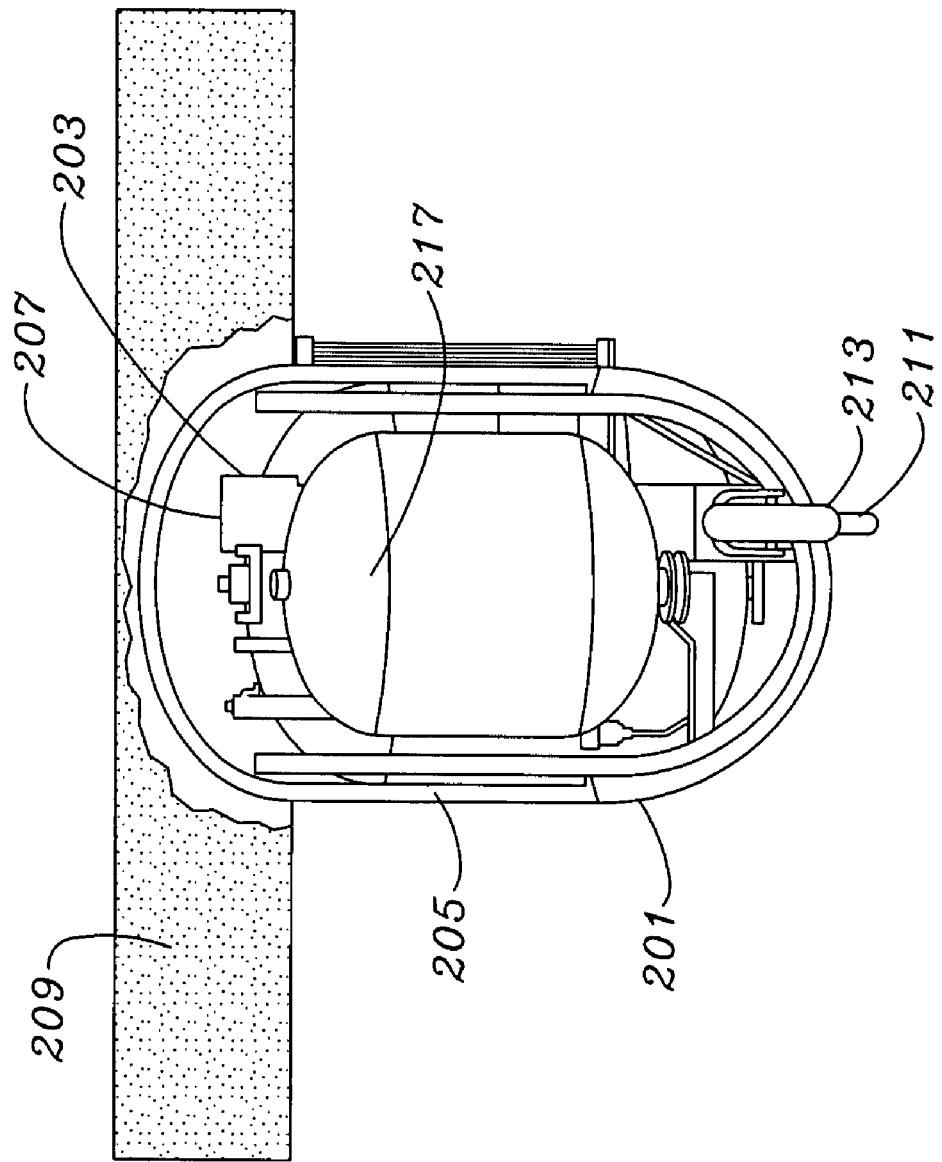
FIG. 2F is a rear elevational, cross-section view of the energy storage system pod depicted in FIG. 2A.
Figure 3A:
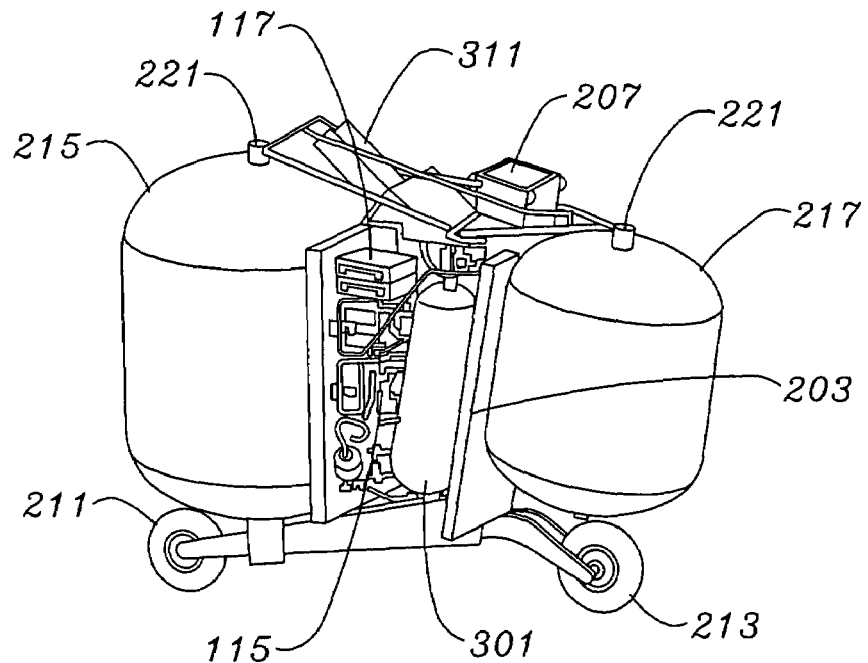
FIG. 3A is a left, rear perspective view of internal portions of the energy storage system pod depicted in FIG. 2A.
Figure 3B:
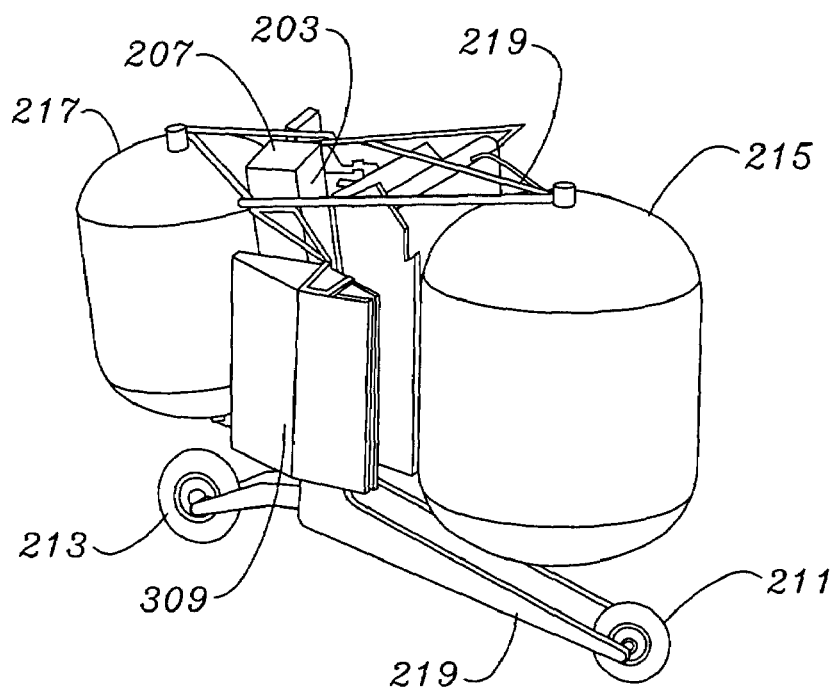
FIG. 3B is a right, front perspective view of the internal portions depicted in FIG. 3A.
Figure 4A:
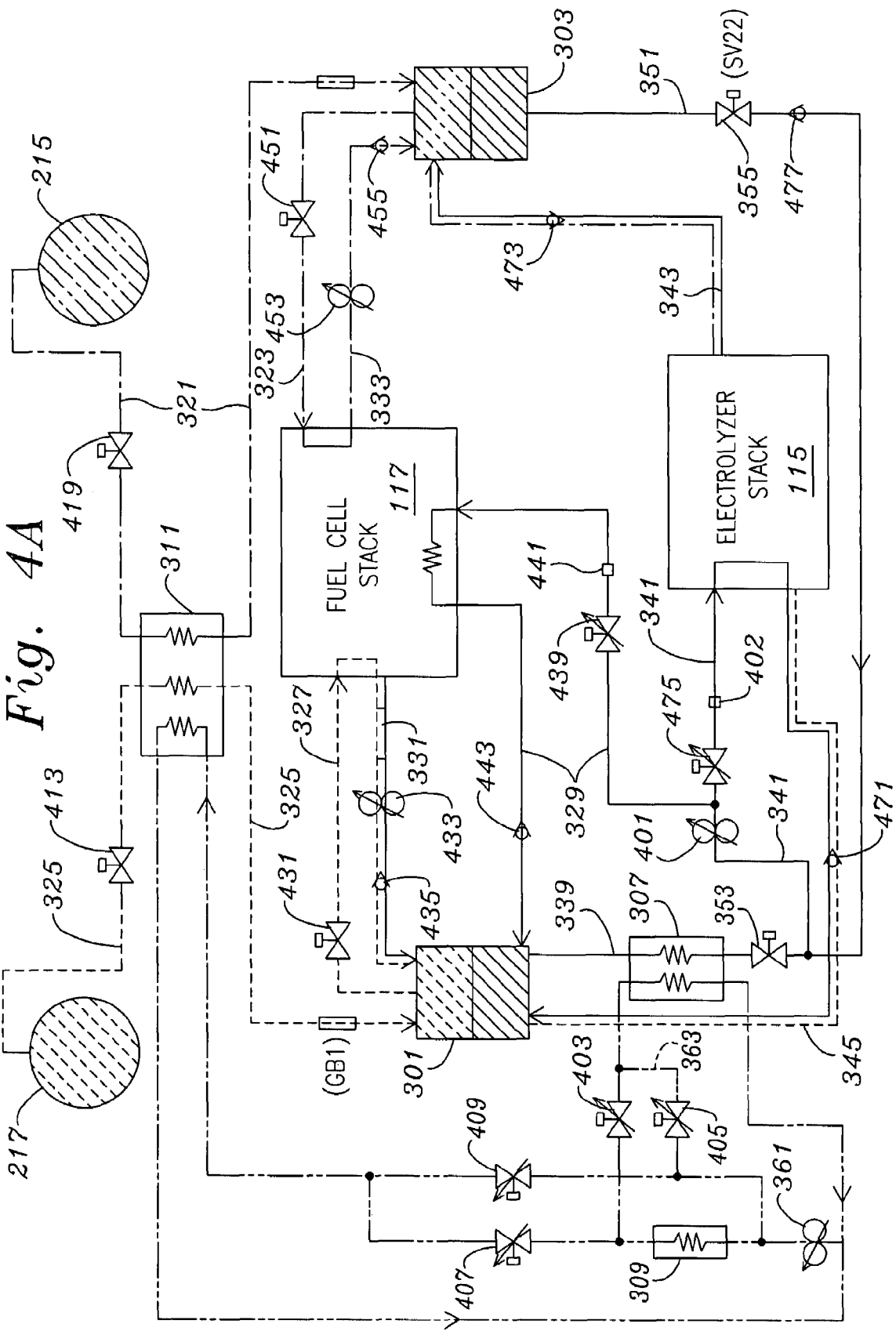
FIG. 4A is a schematic diagram of the energy storage system pod depicted in FIG. 2A.
Figure 4B:
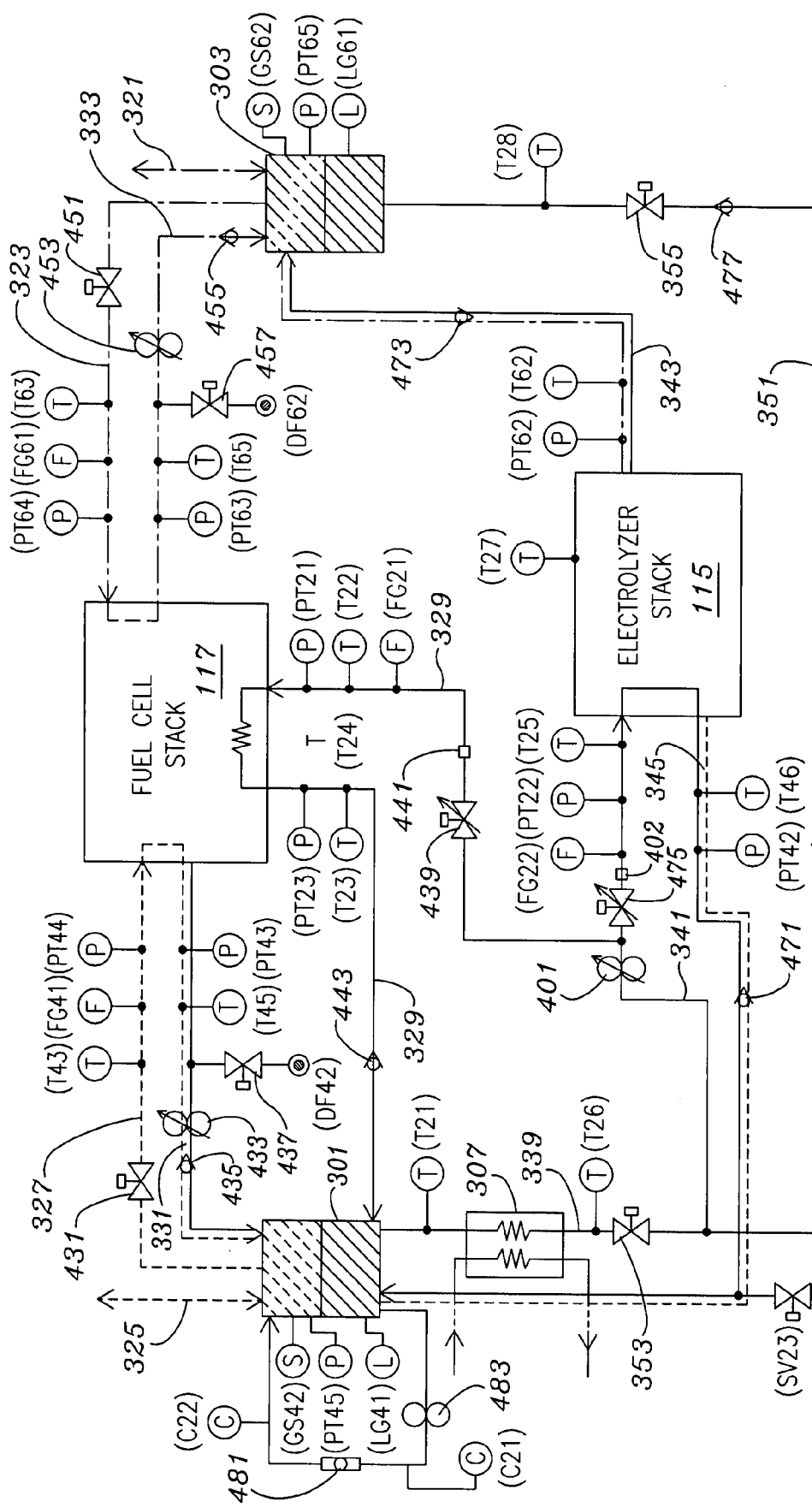
FIG. 4B is a detailed schematic diagram of a first portion of the energy storage system pod depicted in FIG. 2A.
Figure 4C:
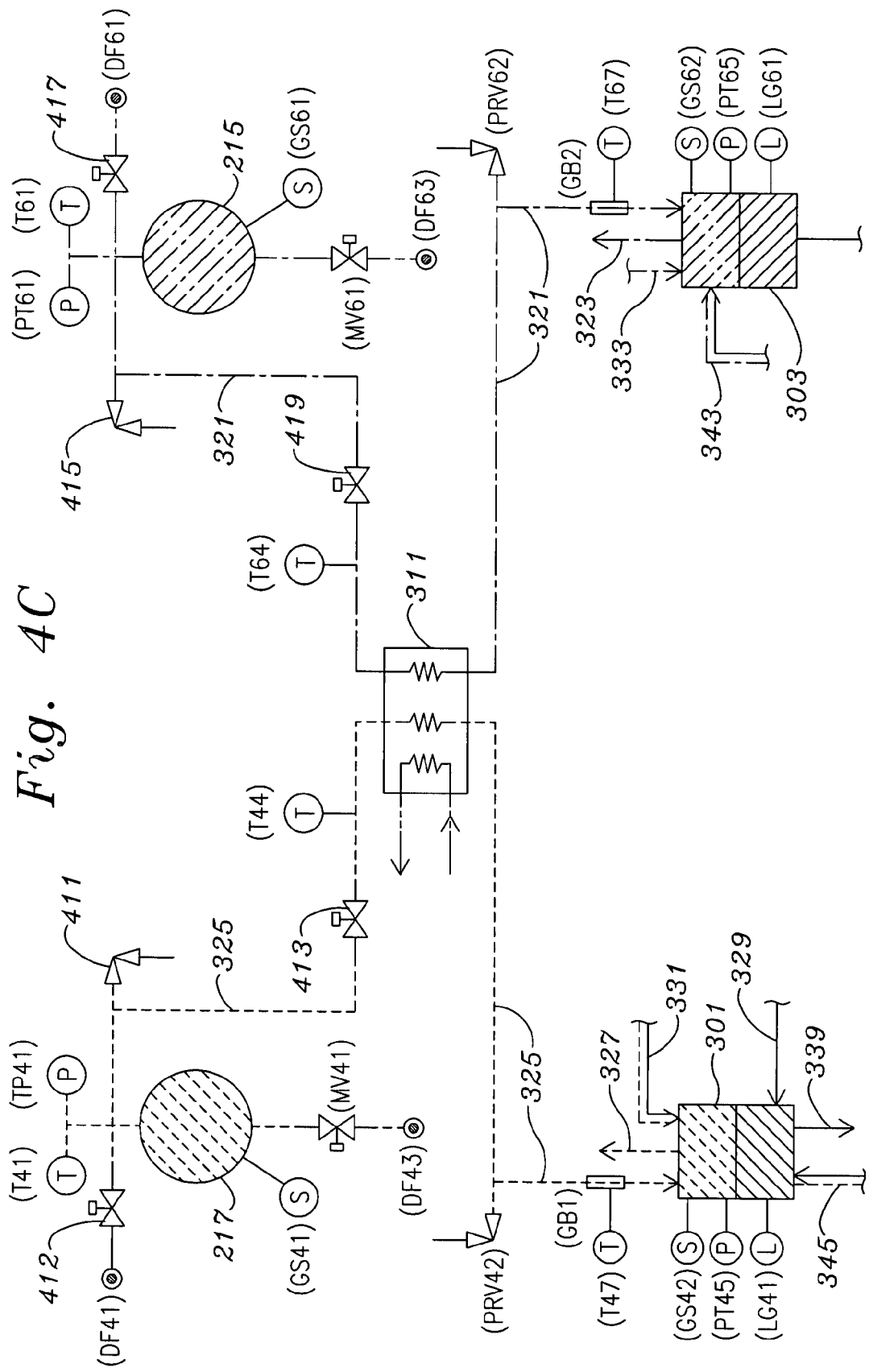
FIG. 4C is a detailed schematic diagram of a second portion of the energy storage system pod depicted in FIG. 2A.
Figure 4D:
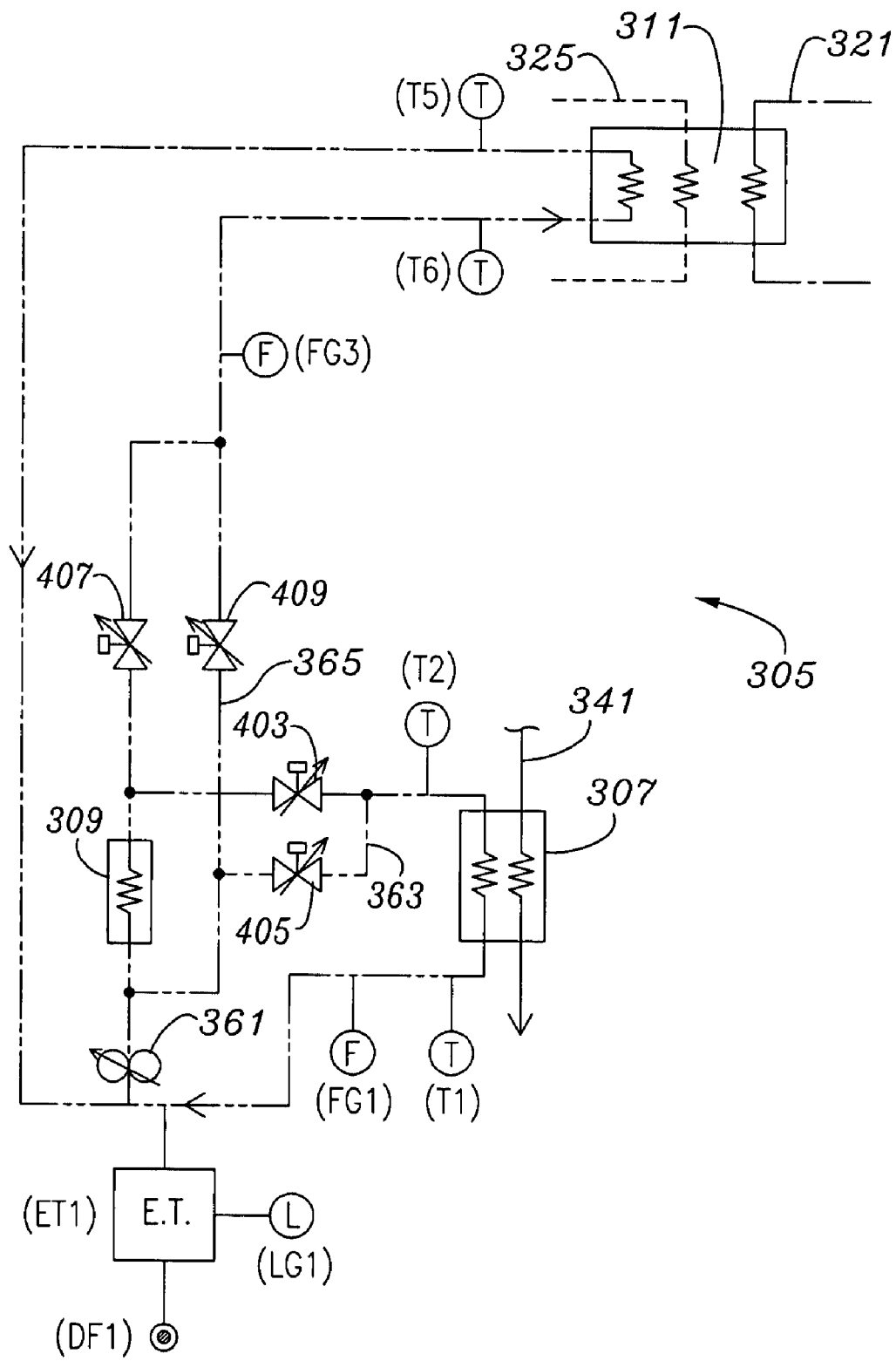
FIG. 4D is a detailed schematic diagram of a third portion of the energy storage system pod depicted in FIG. 2A.

As is clear in FIGS. 2C, 2D and 2G, the outer shell has an airfoil-shaped profile 231 in a plan (downward) view. The size and shape of the cross-sectional airfoil-shaped profile varies downward along a vertical axis of the shell, as is suggested by the shell outline depicted in FIGS. 2A and 2B. Therefore, the airfoil-shaped profile defines a camber thickness that varies along a chord line 233 of the airfoil-shaped profile.

Preferably, the forward, larger fuel tank 215 extends substantially or entirely across the airfoil-shaped profile 231 at a chord location 235 at or near the chord location 237 of greatest camber thickness 239. In this context, "substantially across" means fully across other than space required for local support structure or structural requirements such as movement clearances, and "substantially near" means at a location having a camber thickness equivalent to that at the location of camber thickness, from a perspective of tank capacity. The rearward, smaller oxidizer tank 217 is preferably at chord location 241 having a narrower camber thickness 243, such as a chord location having a camber thickness inadequate for mounting the forward tank.

This configuration provides for a weight and cost efficient tank shape (e.g., cylindrical) to be used in an aerodynamic shell that is efficient from the standpoint of weight and drag. Furthermore, the placing of the product-containing devices between the two tanks provides for a more constant energy storage system center of gravity, which prevents interference with aircraft flight characteristics during operation of the energy storage system. Additionally, with the energy storage system components, with the exception of the tanks, packaged tightly together, the thermal environment of the components can be regulated with a minimum amount of thermal insulation and its associated weight.

Energy Storage System

The design of the energy storage system utilizes and/or works with several interdependent subsystems to provide a lightweight, high-efficiency, reliable energy storage system that enables continuous solar aircraft flight at high altitudes. The energy storage system preferably has a specific energy that is greater than 400 Whr/kg. The unique and innovative features of these subsystems contribute to the overall operating efficiency, fault tolerance, and flexibility of the energy storage system.

With reference to FIG. 4A-4D, in addition to the fuel cell stack 117, the electrolyzer stack 115, the fuel tank 215 and the oxidizer tank 217, the energy storage system further includes an oxidizer phase separator tank 301 (or "oxidizer phase separator"), a fuel phase separator tank 303 (or "fuel phase separator"), and a preferably ethanol-based heat management system 305 including a main heat exchanger 307, a ram-air heat exchanger 309, and a bidirectional drier 311 (i.e., a drier configured for both heating and cooling). The fuel cell stack and electrolyzer stack are designed to operate over a wide pressure range (e.g., from 40 to 400 psig), which allows them to match the overall system pressure over a wide range of operating pressures.

The fuel tank 215 is configured to provide a stream of dry, gaseous fuel (e.g., $H_2$) to the fuel phase separator 303 via a bidirectional fuel line 321 (i.e., a line where fuel can flow in both directions). The fuel phase separator is configured such that a stream of gaseous fuel can be drawn into an anode side of the fuel cell stack 117 via a fuel input line 323. Likewise, the oxidizer tank 217 is configured to provide a stream of dry, gaseous oxidizer (e.g., $O_2$) to the oxidizer phase separator 301 via a bidirectional oxidizer line 325 (i.e., a line where the oxidizer can flow in both directions). The oxidizer phase separator is configured such that a stream of gaseous oxidizer can be drawn into a cathode side of the fuel cell stack 117 via an oxidizer input line 327.

As will be discussed below, the streams of dry, gaseous oxidizer and dry gaseous fuel are warmed prior to reaching their respective phase separators. The phase separators will typically contain warm liquid product and unreacted humid gases, which humidify and further warm the streams of dry gases from the storage tanks before they are drawn to the fuel cell stack 117.

The fuel cell stack 117 is configured as a proton exchange membrane fuel cell to react the stream of gaseous fuel from the fuel input line 323 with the stream of gaseous oxidizer from the oxidizer input line 327 to produce a stream of liquid product (e.g., $H_2O$), and electrical power that is delivered to the main aircraft power bus. As is described further below, a fuel-cell cooling line 329 is configured to pass through the fuel cell stack, such that liquid product can be used to remove excess heat from the fuel cell stack.

The stream of liquid product produced by the fuel cell stack 117 is typically intermixed with unreacted oxidizer. Therefore the fuel cell stack is configured such that a stream containing a mix of product and humid oxidizer (i.e., oxidizer that passed through the fuel cell cathode without reaction, and that now contains evaporated liquid product) is drawn out of the fuel cell stack via a product output line 331. The product output line connects to the oxidizer phase separator, into which the mix stream can be pumped. The oxidizer phase separator is configured to separate the mix stream liquid product from the mix stream humid oxidizer. The configuration of the oxidizer phase separator allows the separated humid oxidizer to intermix with the stream of gaseous oxidizer from the bidirectional oxidizer line 325, to thereby recover the unreacted oxidizer for use in the fuel cell.

The oxidizer phase separator is configured with an adequate liquid product capacity to contain all of the liquid product generated by the fuel cell stack 117 through its intended operational limit. Preferably, the oxidizer phase separator is configured with an adequate liquid product capacity to contain all of the liquid product generated through the processing of substantially all the gaseous fuel and/or gaseous oxidizer available in the fuel and oxidizer tanks. In this context, "substantially all" refers to all the gaseous fuel and/or gaseous oxidizer other than the small quantity that would naturally remain in the tanks and lines when the gaseous fuel and/or gaseous oxidizer supply was essentially depleted. As a result, there is no need for the weight and expense of providing a separate storage tank for the liquid product, along with its necessary pumps, sensors, overflow valves, and the like.

The fuel cell stack 117 also emits a stream of unreacted fuel from its anode side. The fuel cell stack is configured for the unreacted fuel to be drawn out of the fuel cell stack via an unreacted-fuel output line 333, and pumped into the fuel phase separator. The fuel phase separator is configured such that the stream of unreacted fuel, which may be humid fuel (i.e., fuel that passed through the fuel cell anode without reaction, and that now contains evaporated liquid product), is intermixed with the stream of gaseous fuel from the bidirectional fuel line 321, to thereby recover the unreacted fuel for use in the fuel cell stack. If any liquid product should be emitted from the anode side of the fuel cell stack, the fuel phase separator is configured to separate the liquid product from the humid fuel.

The electrolyzer stack 115 is configured as a proton exchange membrane electrolyzer, receiving electrical power from the aircraft power bus (e.g., originating from the solar cells), and using it to separate a stream of liquid product into a stream of a first mixture including the liquid product and the gaseous fuel, and a stream of a second mixture including the liquid product and the gaseous oxidizer.

The oxidizer phase separator is configured to have a stream of liquid product drawn through a product-output line 339 and an electrolyzer input line 341 and then pumped to the electrolyzer stack 115 during electrolyzer stack operation. The electrolyzer stack is configured to perform the separation on this stream of liquid product, and to pass the resulting first mixture stream out through a first mixture output line 343, and the resulting second mixture stream out through a second mixture output line 345. The first and second mixture output lines are configured to pass their mixture streams to the fuel phase separator and oxidizer phase separator, respectively. As noted above, each of the phase separators is configured to separate liquid product from the humid gas.

During operation of the electrolyzer stack, the fuel cell stack 117 is not ordinarily operated, or is only operated at a very low level. With the exception of any oxidizer sent to the fuel cell stack, the oxidizer phase separator is configured to pass the received gaseous oxidizer back through the bidirectional oxidizer line 325, and on to the oxidizer tank. Likewise, with the exception of any fuel sent to the fuel cell stack, the fuel phase separator is configured to pass the received gaseous fuel back through the bidirectional fuel line 321, and on to the fuel tank.

Over a period of operation, the fuel phase separator may contain significant amounts of liquid fuel. The fuel phase separator is configured with a product-reduction line 351 for liquid product to be drawn into the electrolyzer input line 341. Both the product-output line and the product-reduction line have solenoid valves, 353 and 355, respectively, configured such that the electrolyzer input line stream can be redirected to come from the fuel phase separator. The control system is configured to operate these valves to that end when a triggering maximum level of liquid fuel accumulates in the fuel phase separator. The control system is further configured to reset these valves and redirect the electrolyzer input stream to be from the oxidizer phase separator when a triggering minimum level of liquid fuel is left in the fuel phase separator.

The energy management system includes the heat management system 305 to accommodate the thermal needs of other portions of the energy management system. The heat management system preferably includes two intermixed coolant loops: a main coolant loop and a bidirectional-drier coolant loop. Preferably, the heat management system uses low freezing point fluid coolant, such as ethanol, to exchange heat between the atmosphere and system components. Both coolant loops share the ram-air heat exchanger, which is configured to radiate excess heat into the atmosphere, and a coolant pump. Each coolant loop is configured with a separate, controllable bypass line to bypass the ram-air heat exchanger.

The main coolant loop includes the coolant pump, the ram-air heat exchanger, a first ram-air heat exchanger bypass line 363, and the main heat exchanger. The main heat exchanger is configured to cool liquid product flowing in the line leading from the oxidizer separation tank to the electrolyzer stack and the fuel cell stack 117 (via the fuel-cell cooling line 329). The main coolant loop is thus configured to remove heat from the fuel cell stack. This heat can either be radiated via the ram-air heat exchanger, or passed on to the bidirectional drier coolant loop.

The bidirectional drier coolant loop includes the coolant pump, the ram-air heat exchanger, a second ram-air heat exchanger bypass line 365, and the bidirectional drier. The bidirectional drier is configured to either heat or cool both the bidirectional oxidizer line 325 and the bidirectional fuel line 321. In a first mode of operation, the bidirectional drier coolant loop is configured to use the heat from the fuel cell stack 117 (via the main coolant loop) to warm the streams of dry, gaseous oxidizer and dry, gaseous fuel passing through the bidirectional oxidizer line 325 and the bidirectional fuel line, respectively, on their way to the fuel cell stack.

In a second mode of operation, the bidirectional drier coolant loop is configured to use the ram-air heat exchanger to cool the bidirectional oxidizer line 325 and the bidirectional fuel line 321 such that the humidity (evaporated product) is frozen out of the streams of humid oxidizer and humid fuel, respectively. This freezing of the humidify dries the oxidizer and fuel to allow only dry, gaseous oxidizer and dry, gaseous fuel to reach the respective storage tanks. Because only dry oxidizer and fuel reach the storage tanks, little or no thermal management need be provided for the storage tanks. During the first mode of operation, the frozen product in each line's passage through the bidirectional drier is thawed and returned to the respective phase separators.

Detailed Operation of the Electrolyzer (Charging)

The electrolyzer stack 115 uses electrical energy and a stream of the liquid product to produce streams of the gaseous fuel and gaseous oxidizer, which are routed to and stored in the storage tanks.

In particular, the oxidizer phase separator 301 serves as a liquid product storage tank, and as a gas/liquid phase separator. A stream of the liquid product is pumped from the oxidizer phase separator through the product-output line 339 and the electrolyzer input line 341, and into the oxidizer side of the electrolyzer stack 115, and is used both as a reactant and as a cooling fluid. At the direction of the control system, a variable flow, product-output line pump 401 drives and regulates the product flow through an electrolyzer input line filter 402 and the electrolyzer stack. A flow gauge (FG22), temperature sensors (T25) and (T46), and pressure transducers (PT22) and (PT42) monitor the parameters of this stream for the control system.

At the direction of the control system, the main heat exchanger 307 is used to maintain the desired product temperature as it enters the electrolyzer stack. The coolant pump 361 circulates the coolant between the main heat exchanger and the ram-air heat exchanger 309 to radiate heat. A pair of main-loop proportional valves 403 and 405, together with a temperature sensor (T2), are used to control the temperature of the coolant at the inlet of the main heat exchanger by controlling the bypass of the ram-air heat exchanger in the main cooling loop. This cooling loop operates at ambient pressure.

The temperature sensor (T21) is used to monitor the temperature of the oxidizer phase separator 301 and also the product input stream at an inlet to the main heat exchanger 307. A temperature sensor (T26) monitors the temperature at the exit of the main heat exchanger 307 and is used to verify the proper operation of the main cooling loop for the control system. A temperature sensor (T1) and a flow gauge (FG1) are used to assess the proper operation of this cooling loop.

The first mixture output line 343 passes a stream containing a mixture of humid fuel and product to the fuel phase separator 303, and the second mixture output line 345 passes a stream containing a mixture of humid oxidizer and product to the oxidizer phase separator 301. As noted above, each of the phase separators is configured to separate the liquid product from the humid gases.

Electrolyzer oxidizer check valve 471 and electrolyzer fuel check valve 473 prevent back flow of oxidizer and fuel, respectively, in the event of a failure in the electrolyzer stack 115. The proportional, electrolyzer input valve 475 is used to regulate the flow of product to the electrolyzer stack when it is not in use. During electrolyzer operation, the electrolyzer input valve will be fully open, and during fuel cell operation it may be partially open to maintain the electrolyzer stack temperature at a desired value.

A significant amount of product is transferred to the fuel side of the electrolyzer stack 115, and thus to the fuel phase separator 303 during the operation of the electrolyzer. The fuel phase separator 303 separates the bulk of the liquid product from the gaseous fuel stream. The liquid product level in the fuel phase separator 303 is reported to the control system by level gauge (LG61). The fuel phase separator is also equipped with a pressure transducer (PT65).

The liquid product is preferably transferred periodically to the oxidizer side of the electrolyzer stack 115. This liquid product transfer is performed by opening the product-reduction line valve 355 and closing the product-output line valve 353, thus allowing the product output line pump 401 to pump the liquid product from the fuel phase separator 303 regardless of the pressure differential between the oxidizer and fuel sides of the electrolyzer stack. A product-reduction line check valve 477 prevents accidental back flow in the product-reduction line. When the liquid product level in the fuel phase separator 303 reaches a preset low limit, the product-output line valve 353 is opened and the product-reduction line valve 355 is closed, and the system resumes normal operation.

An ion-exchange column 481, situated on the side of the oxidizer phase separator 301, continuously removes metal ions from the liquid product received and stored in the oxidizer phase separator, which helps prolong the life of the electrolyzer stack 115. An ion-exchange-column pump 483 is used to circulate the liquid product from the oxidizer phase separator through the ion exchange column. A level sensor (LG41) monitors the liquid product level in the oxidizer phase separator tank for the control system.

The electrolyzer effectively acts as a compressor and "pumps" the gaseous oxidizer and fuel up to a high pressure (e.g., 400 psig) during the electrolyzer charging cycle. Under the pumping action of the electrolyzer, the oxidizer phase separator passes the received humid, gaseous oxidizer back through the bidirectional oxidizer line 325. Likewise, the fuel phase separator passes the received, humid, gaseous fuel back through the bidirectional fuel line 321.

Before entering the gaseous fuel and oxidizer storage tanks, the humid fuel and oxidizer streams are dried to a dew point below −20° C. This is accomplished by cooling the gases using a freeze-dry methodology. In particular, the bidirectional drier 311, which is a heat exchanger, uses cold liquid flow from the ram-air heat exchanger 309. Optionally, the lower part of the drier cools the gases to temperatures above freezing, allowing the majority of the water vapor to condense out on the drier walls and flow back into the phase separator. The upper part of the drier is operated at temperatures well below freezing, such that most of the remaining water vapor is frozen out of the drier walls. Sufficient volume is provided in the drier to accommodate one charge cycle worth of ice buildup without risking clogging of the gas flow path. The drier can be unitary, or it can be two units—one on each bidirectional line. This lightweight, high efficiency drier is preferably configured to prevent ice from clogging the flow path and plugging the drier.

The control system controls the temperature of the inlet stream using two proportional bidirectional-drier loop valves 407 and 409 and a signal from a temperature sensor (T6), which is on the inlet of the side of the bidirectional drier 311. A flow gauge (FG3) and a temperature sensor (T5) are used to calculate the efficiency of the cooling operation. Temperature sensors (T44) and (T64) measure the temperatures at the exit of bidirectional drier 311 for the dried gaseous oxidizer and the dried gaseous fuel, respectively, and are used to verify the proper operation of the bidirectional drier.

The dried gaseous oxidizer and dried gaseous fuel are preferably stored at pressures up to 400 psig in the storage tanks. The oxidizer tank 217 is equipped with a pressure relief valve 411. This valve is set at the maximum acceptable tank operating pressure and will open in an event of a malfunction of the pressure control system to prevent tank rupture if the pressure rises above the preset limit. An oxidizer-vent solenoid valve 412 can be used for venting of the reactant. An bidirectional oxidizer line solenoid valve 413 is used by the control system to isolate the oxidizer tank 217 in an event of a malfunction in other parts of the system. A gas sensor (GS41) monitors the concentration of fuel in the oxidizer tank for the control system.

Likewise, the fuel tank 215 is equipped with a pressure relief valve 415. This valve is set at the maximum acceptable tank operating pressure and will open in an event of a malfunction of the pressure control system to prevent tank rupture or explosion. A fuel-vent solenoid valve 417 can be used for venting of the reactant. A bidirectional fuel line solenoid valve 419 is used by the control system to isolate the fuel tank in an event of a malfunction in other parts of the system. A gas sensor (GS61) monitors the concentration of the oxidizer in the fuel tank.

Detailed Operation of the Fuel Cell (Discharging)

During fuel cell operation, the gaseous oxidizer flows from the oxidizer tank 217, through the oxidizer solenoid valve 413, the bidirectional drier 311, the oxidizer phase separator 301, an oxidizer-input-line solenoid valve 431, a flow gauge (FG41), the oxidizer side of the fuel cell stack 117, a product-output-line pump 433, a product-output-line check valve 435, and back to the oxidizer phase separator 301. The fuel cell can operate at tank pressures up to 400 psi and as such does not require complex and heavy gas pressure regulation at the fuel cell inlets. A product-output-line solenoid valve 437 is used to vent/purge the oxidizer side of the stack when needed.

Liquid product from the oxidizer phase separator 301 is used as a cooling fluid for the fuel cell. In this case, liquid product from the oxidizer phase separator flows through the main heat exchanger 307, the product-output line valve 353, the product-output line pump 401, a fuel-cell-cooling-line proportional valve 439, a fuel-cell cooling line filter 441, a flow gauge (FG21), the cooling plates of the fuel cell stack 117, and back to the oxidizer phase separator tank. A fuel-cell-cooling-line check valve 443 prevents back flow in an event of a malfunction. Pressure sensors (PT21) and (PT23), and temperature sensors (T22) and (T23) are used to control the flow through the cooling loop of the fuel cell stack 117.

Fuel from the fuel tank 215 flows through the fuel cell stack 117 via the solenoid valve (SV63), the bidirectional drier 311, the fuel phase separator 303, a fuel-input-line solenoid valve 451, a flow gauge (FG61), the fuel side of the fuel cell stack, a fuel-input-line pump 453, a fuel-input-line check valve 455, and then returns to the fuel phase separator. A solenoid valve 457 is used to controllably purge the fuel side of the fuel cell stack.

The gaseous fuel and gaseous oxidizer, which are stored at very low temperature (e.g., −40 degrees C. or less) in the storage tanks, are first heated up to temperatures above 0 degrees C. in the device that was used for drying them during the day, and then they are humidified in the fuel and oxidizer phase separators.

During fuel cell operation a small amount of liquid product may make its way to the fuel phase separator 303 as a vapor or small droplets carried with the fuel stream. This liquid product condenses and is collected at the bottom of the fuel phase separator and sent back to the oxidizer phase separator 301 periodically, by opening the product-reduction line valve 355 and closing the product-output line valve 353, regardless of the pressure differential between the fuel and oxidizer side of the system.

The liquid product from the fuel cell stack 117 is stored in the oxidizer phase separator 301. The liquid product exits the fuel cell stack with the excess oxidizer stream in vapor and liquid form. The oxidizer phase separator 301 serves as a phase separator and prevents liquid product from reaching the fuel cell stack inlet. The ion-exchange column 481 is used as needed and the ion-exchange-column pump 483 is controlled based upon a signal from a liquid product conductivity probe (C21). A liquid product conductivity probe (C22) is used to assess the efficiency of the ion-exchange bed. No change in the conductivity of the liquid product at nominal flow condition would indicate that it is time to replace the ion-exchange resin in the column.

During fuel cell operation, the bidirectional drier is used to preheat the cold gases coming from the gaseous fuel and oxidizer tanks. In this case—warm coolant is sent to the drier, bypassing the ram-air heat exchanger 309. During fuel cell operation the bidirectional drier is warmed above freezing, which melts the frozen product from prior drying operations, and leading to water flowing back into the phase separator. The bidirectional-drier loop valves 407 and 409 may be fully closed and fully open to entirely bypass the ram-air heat exchanger 309. The main-loop proportional valves 403 and 405 are used to control the temperature of the coolant on the shell side of the main heat exchanger 307.

While a particular form of the invention is illustrated and described, it will be apparent that various modifications can be made without departing from the spirit and scope of the invention. Thus, although the invention is described in detail with reference only to the preferred embodiment, those having ordinary skill in the art will appreciate that various modifications can be made without departing from the invention.

Structure

The energy storage system design utilizes lightweight composite structures for the primary pod structure, tanks, and fuel cell and electrolyzer stack end plates. Lightweight polymer materials are used in the fuel cell, electrolyzer, and tank design. Using the drier to dry the hydrogen and oxygen gases before they are stored in their respective tanks preferably eliminates the need for a heavy thermal control system on the tanks. The parts of the system that contain water are housed in a lightweight, thermal enclosure that keeps the water from freezing throughout the operational cycle.

Lightweight composite tanks with low-temperature polymer liners are used to store the dry oxygen and hydrogen gases. Polymer liners integral with the composite shell are used to prevent leaks of hydrogen and oxygen from the system. These are preferably, as composite tanks with metal liners are likely to have a significant weight cost for the preferred aircraft applications.

From the above description, it should be clear that a single liquid product system provides a variety of functions. Stack product management is achieved by using phase separation tanks to collect water from the fuel cell stack exhaust streams. Product can be transferred from the fuel side to the oxidizer side of the system. The product is also used to cool the fuel cell during operation. During electrolyzer operation, the product is fed into the electrolyzer for dissociation into oxidizer and fuel. The aircraft can be fueled by simply adding product (e.g., water) to the oxidizer phase separator at the start of the flight.

We claim:

1. A closed loop energy storage system comprising:
a fuel tank configured to store dried gaseous fuel;
an oxidizer tank configured to store dried gaseous oxidizer;
a fuel cell stack configured to react the gaseous fuel with the gaseous oxidizer to produce a liquid product and electrical power;
an electrolyzer stack configured to separate the liquid product into a humid fuel including the gaseous fuel and product humidity, and a humid oxidizer including the gaseous oxidizer and product humidity;
a system of lines, including fuel lines interconnecting the fuel tank with the fuel cell stack and the electrolyzer stack, and oxidizer lines interconnecting the oxidizer tank with the fuel cell stack and the electrolyzer stack;
a heat exchanger in thermal contact with fuel and oxidizer within a portion of the system of lines, and being configured both for heating and freezing the fuel and oxidizer within the portion of the system of lines; and
a controller programmed to control the operation of the fuel cell stack, the electrolyzer, and the heat exchanger such that the heat exchanger heats fuel and oxidizer within the portion of the system of lines during operation of the fuel cell stack, and such that the heat exchanger freezes the fuel and oxidizer within the portion of the system of lines during operation of the electrolyzer stack.

2. The energy storage system of claim 1, wherein the heat exchanger is configured to transfer heat from the fuel cell stack to the portion of the system of lines during operation of the fuel cell stack to preheat the gaseous fuel from the fuel tank and the gaseous oxidizer from the oxidizer tank.

3. The energy storage system of claim 1, wherein the humid fuel produced by the electrolyzer stack is intermixed with liquid product, and the humid oxidizer produced by the electrolyzer stack is intermixed with liquid product, and further comprising:
a first phase separator intermediate the electrolyzer stack and the portion of the system of lines, the first phase separator being configured to separate the liquid product from the humid fuel; and a second phase separator intermediate the electrolyzer stack and the portion of the system of lines, the second phase separator being configured to separate the liquid product from the humid oxidizer.

4. The energy storage system of claim 1, wherein the portion of the system of lines is external to the fuel tank and the oxidizer tank.

5. The energy storage system of claim 1, wherein the portion of the system of lines includes at least one fuel line intermediate the fuel tank and the fuel cell stack, at least one fuel line intermediate the fuel tank and the electrolyzer stack, at least one oxidizer line intermediate the oxidizer tank and the fuel cell stack, and at least one oxidizer line intermediate the fuel tank and the electrolyzer stack.

6. A method for storing available energy and providing needed energy, comprising:

providing closed loop energy storage system of claim 1;

operating the fuel cell stack using gaseous fuel from the fuel tank and gaseous oxidizer from the oxidizer tank to produce the liquid product and electrical energy during times when energy is needed;

operating the heat exchanger during fuel cell stack operation to preheat the gaseous fuel from the fuel tank and the gaseous oxidizer from the oxidizer tank prior to the gaseous fuel and the gaseous oxidizer being reacted in the fuel cell stack;

operating the electrolyzer stack to separate liquid product into humid fuel that includes gaseous fuel and product humidity, and humid oxidizer that includes gaseous oxidizer and product humidity, during times when energy is available;

operating the heat exchanger during electrolyzer stack operation to freeze the product humidity out of the humid fuel and the humid oxidizer to produce dried gaseous fuel and dried gaseous oxidizer.

7. The method of claim 6, wherein during fuel cell stack operation, heat from the fuel cell is used by the heat exchanger to preheat the gaseous fuel and gaseous oxidizer.

8. A method for storing available energy and providing needed energy, comprising:

providing closed loop energy storage system of claim 3;

operating the fuel cell stack using gaseous fuel from the fuel tank and gaseous oxidizer from the oxidizer tank to produce the liquid product and electrical energy during times when energy is needed;

operating the heat exchanger during fuel cell stack operation to preheat the gaseous fuel from the fuel tank and the gaseous oxidizer from the oxidizer tank prior to the gaseous fuel and the gaseous oxidizer being reacted in the fuel cell stack;

operating the electrolyzer stack to separate liquid product into humid fuel that includes gaseous fuel and product humidity, and humid oxidizer that includes gaseous oxidizer and product humidity, during times when energy is available;

operating the heat exchanger during electrolyzer stack operation to freeze the product humidity out of the humid fuel and the humid oxidizer to produce dried gaseous fuel and dried gaseous oxidizer.

9. The method of claim 8, wherein during fuel cell stack operation, heat from the fuel cell is used by the heat exchanger to preheat the gaseous fuel and gaseous oxidizer.

* * * * *